(12) United States Patent
Lagarde et al.

(10) Patent No.: US 8,469,171 B2
(45) Date of Patent: Jun. 25, 2013

(54) SPRING-LOADED BRAKE FOR AN ACTUATOR FOR DRIVING A HOUSEHOLD SCREEN AND ACTUATOR EQUIPPED WITH SUCH A BRAKE

(75) Inventors: Eric Lagarde, Sallanches (FR); Frédéric Negrello, Cluses (FR)

(73) Assignee: Somfy SAS, Cluses/Cedex (FR)

( * ) Notice: Subject to any disclaimer, the term of this patent is extended or adjusted under 35 U.S.C. 154(b) by 516 days.

(21) Appl. No.: 12/725,349

(22) Filed: Mar. 16, 2010

(65) Prior Publication Data
US 2010/0236891 A1 Sep. 23, 2010

(30) Foreign Application Priority Data
Mar. 17, 2009 (FR) .................................. 09 51684

(51) Int. Cl.
*E06B 9/84* (2006.01)
*F16D 51/04* (2006.01)

(52) U.S. Cl.
USPC ........................................ 192/223.4; 160/298

(58) Field of Classification Search
USPC ........................................................ 192/223.4
See application file for complete search history.

(56) References Cited

U.S. PATENT DOCUMENTS

| | | | | |
|---|---|---|---|---|
| 3,002,594 A | * | 10/1961 | Haseler et al. | 192/223.4 |
| 3,393,777 A | * | 7/1968 | Sacchini | 192/223.4 |
| 3,757,472 A | * | 9/1973 | Rogakos | 49/40 |
| 4,579,201 A | * | 4/1986 | Tiedeman | 192/223.4 |
| 4,614,257 A | * | 9/1986 | Harada et al. | 192/223.4 |
| 4,646,888 A | * | 3/1987 | Higuchi et al. | 192/223.4 |
| 4,926,987 A | * | 5/1990 | Honma | 192/223.4 |
| 5,573,472 A | * | 11/1996 | Ciolli | 475/301 |
| 5,857,553 A | * | 1/1999 | Lagarde et al. | 192/223 |
| 6,173,825 B1 | * | 1/2001 | Liu | 192/223.4 |
| 6,700,246 B1 | * | 3/2004 | Bruhn | 310/77 |
| 7,128,126 B2 | * | 10/2006 | Smith et al. | 160/319 |
| 7,648,014 B2 | * | 1/2010 | Koga | 192/223.4 |
| 2007/0068765 A1 | * | 3/2007 | Koga | 192/219.4 |
| 2010/0320855 A1 | * | 12/2010 | Lagarde et al. | 310/77 |

FOREIGN PATENT DOCUMENTS
FR 2610668 8/1988

\* cited by examiner

*Primary Examiner* — Richard M. Lorence
*Assistant Examiner* — Steven B. Christ
(74) *Attorney, Agent, or Firm* — Dowell & Dowell, PC (57) ABSTRACT

A spring loaded brake for an actuator for driving a household screen includes a helical spring having radially extending end lugs, a friction piece including a friction surface against which the spring presses, an input piece which drives the spring in rotation in one direction to reduce a force of contact between the spring and the surface, an output piece which drives the spring in rotation in a direction to increase the force of contact between the spring and the surface and wherein the brake also includes two end stops which always rotate as one about an axis of the spring and each of which forms a stop to limit axial movement of the spring in opposite directions.

9 Claims, 6 Drawing Sheets

SPRING-LOADED BRAKE FOR AN ACTUATOR FOR DRIVING A HOUSEHOLD SCREEN AND ACTUATOR EQUIPPED WITH SUCH A BRAKE

BACKGROUND OF THE INVENTION:

1. Field of the Invention

The invention relates to a spring-loaded brake for an actuator that drives a household screen of the roller shutter, blind, curtain, grille, projector screen or garage door type. This brake is more suited to motorized actuators and, more particularly, tubular motors. The invention also relates to a rotary actuator for driving a household screen fitted with such a brake.

2. Brief Description of the Related Art

The use of a helical spring-loaded brake in actuators for household screens is known, notably from patents FR-B-2 610 668 and U.S. Pat. No. 6,700,246. In those documents, a helical spring is mounted in a friction piece. At least one turn of the spring is radially stressed by a bore of the friction piece. Each end of the spring forms a lug extending radially towards the inside of the spring. Each lug can be moved in order to drive the rotation of the spring with respect to its axis. An action of an input piece on one side of the first lug causes the spring to rotate in a first direction. An action of an output piece on the opposite side of the first lug causes the spring to rotate in the second direction, that is to say in the opposite direction. Furthermore, the input piece may also act on the second lug of the spring in order to drive the rotation of the spring in the second direction. Likewise, the output piece may act on the second lug of the spring in order to cause the spring to rotate in the first direction. The input piece, the output piece and the spring are assembled in such a way that the action of the input piece on one of the two lugs of the spring tends to reduce the diameter of the external envelope of the spring. Thus, friction between the bore of the friction piece and the turns of the spring decreases, leading to a reduction in the radial stress between the spring and the friction piece. Conversely, action of the output piece on one of the two lugs of the spring tends to increase the diameter of the external envelope of the spring. Friction between the bore of the friction piece and the turns of the spring therefore increases. The same is true of the radial stress between the spring and the friction piece. As a result, the rotation of the input piece allows the spring and the output piece to rotate, while rotation of the output piece immobilizes the spring. In the latter case, the output piece becomes locked or, at the very least, is braked.

When the input piece acts on one lug of the spring, it causes the coil spring to rotate and releases the brake by reducing the friction between the turns and the bore of the friction piece. By rotating inside the bore, the spring moves axially because it behaves like a screw, the helix of the spring acting like the threads of the screw. Hence, when the input piece acts on a first lug, the spring moves axially in a first direction. Conversely, when the input piece acts on a second lug, the spring moves axially in a second direction opposite to the first.

In brakes described in the prior art, the helical spring is stopped axially on one side by the input piece and on the other side either by the output piece or by the friction piece. This design leads to asymmetric brake operation. Specifically, when the input piece drives the rotation of the spring, if the latter is pressed axially against the input piece, the brake operates correctly. By contrast, if the spring is pressed axially against the friction piece, the portion of the turn in contact with the friction piece rubs against this piece, giving rise to a parasitic resistive force which brakes the movement. Efficiency is therefore reduced. When the spring is pressed axially against the output piece a parasitic force is also observed during certain phases of operation of the brake. This phenomenon occurs when there is a variation in speed between the input piece and the output piece. This phenomenon is commonplace in the lowering of a screen, when the load is driving. These parasitic forces cause the system to vibrate, generating noise. Tests have shown that vibrations may arise, on lowering, for a brake torque which, when the spring is pressed against the output piece, is half that encountered in the configuration in which the spring is pressed against the input piece.

SUMMARY OF THE INVENTION

It is these disadvantages that the invention more particularly addresses by proposing a spring-loaded brake the operation of which is more reliable and which has less of a tendency to vibrate than those of the prior art.

To this end, the invention relates to a spring-loaded brake for an actuator for driving a household screen, comprising:
- a helical spring each end of which forms a lug extending radially relative to a central axis of the spring,
- a friction piece comprising a substantially cylindrical friction surface against which at least one turn of the helical spring presses radially,
- an input piece able to come into contact with at least one lug of the spring so as to drive the rotation of the spring about the central axis of the spring in a direction that reduces the force of contact between the helical spring and the friction surface,
- an output piece able to come into contact with at least one lug of the spring so as to drive the rotation of the spring about its axis in a direction increasing the force of contact between the helical spring and the friction surface, wherein said spring-loaded brake comprises two pieces which always rotate as one about the axis of the spring and each of which forms an end stop to an axial movement of the helical spring, and in that the end stop formed by one of these pieces is able to limit the axial movement of the spring in a first direction, whereas the end stop formed by the other piece is able to limit the axial movement of the spring in a second direction opposite to the first direction.

The invention proposes a spring-loaded brake that improves the operation of the previous brakes. In order to obtain symmetric brake operation, that is to say, operation with equivalent performance regardless of the direction of rotation of the driving piece, the axial movement of the coil spring is stopped, in both directions, by two pieces forming the lateral end stops that always rotate as one about the axis of the spring. Through this configuration, the spring is always pressed against a lateral stop piece that has the same speed differential with the spring, regardless as to whether the driving piece is rotating in the one direction or the other. Symmetric brake operation is important when using one and the same actuator regardless of the direction of the torque exerted by the load on the output shaft of the actuator. That makes it possible to rationalize the range offered and make installation easier thanks to the multi-functionality of the motor. There is no risk of fitting error in obtaining optimal operation.

It is possible to provide means of reversible assembly between the two pieces that form the axial end stops.

Advantageously, the axial movement of the spring is stopped by the input piece in one direction and by a piece that always rotates as one with the input piece, in the other direction. Specifically, by causing the spring to rotate, the input piece releases the brake. The actuator then allows the household screen to move without the spring inducing parasitic friction because the spring and the lateral stop piece always have the same rotational speed, at the axial stop, when the brake is released.

Further, one of the pieces forming axial end stops may be a washer engaged, with the possibility of relative rotation, about a member integral with the output piece.

For this type of brake to work it is necessary for at least one turn of the helical spring to press radially against a fixed friction surface. The spring may be mounted as a tight fit in a bore of the friction piece. In this case, the outside diameter of at least one turn of the spring is slightly greater than the inside diameter of the bore of the friction piece. This configuration makes it possible to produce a compact brake. Alternatively, the spring may be mounted as a tight fit on a cylindrical part of the friction piece. In this case, the inside diameter of at least one turn of the spring is slightly smaller than the outside diameter of the cylindrical part of the friction piece.

The input piece, the output piece and the friction piece have to be centred with respect to one another. The input piece and the output piece may be centred by a shaft passing through these pieces. The shaft is mounted as a tight fit in the input piece or the output piece and is mounted as a sliding fit in the other piece, namely the output piece or the input piece, respectively. This centring is simple to achieve and compact. This input piece/output piece subassembly has therefore to be centred with respect to the friction piece. This centring can be achieved either via the output piece or via the input piece.

To make the actuator even more compact, the input piece and/or the output piece may constitute one element of a reduction stage of the actuator.

According to another advantageous aspect of the invention, at least one axial end stop of the spring is produced in the form of a helical surface the angle of the helix of which is substantially equal to that of the spring.

The invention also relates to a rotary actuator for driving a household screen, which comprises a spring-loaded brake as mentioned hereinabove. An actuator such as this is more reliable than those of the prior art and has symmetric operation independent of the direction of rotation of its output shaft.

BRIEF DESCRIPTION OF THE DRAWINGS

The invention will be better understood from reading the description which will follow, given solely by way of example and made with reference to the attached drawings in which.

DESCRIPTION OF THE PREFERRED EMBODIMENTS

Figure 1:
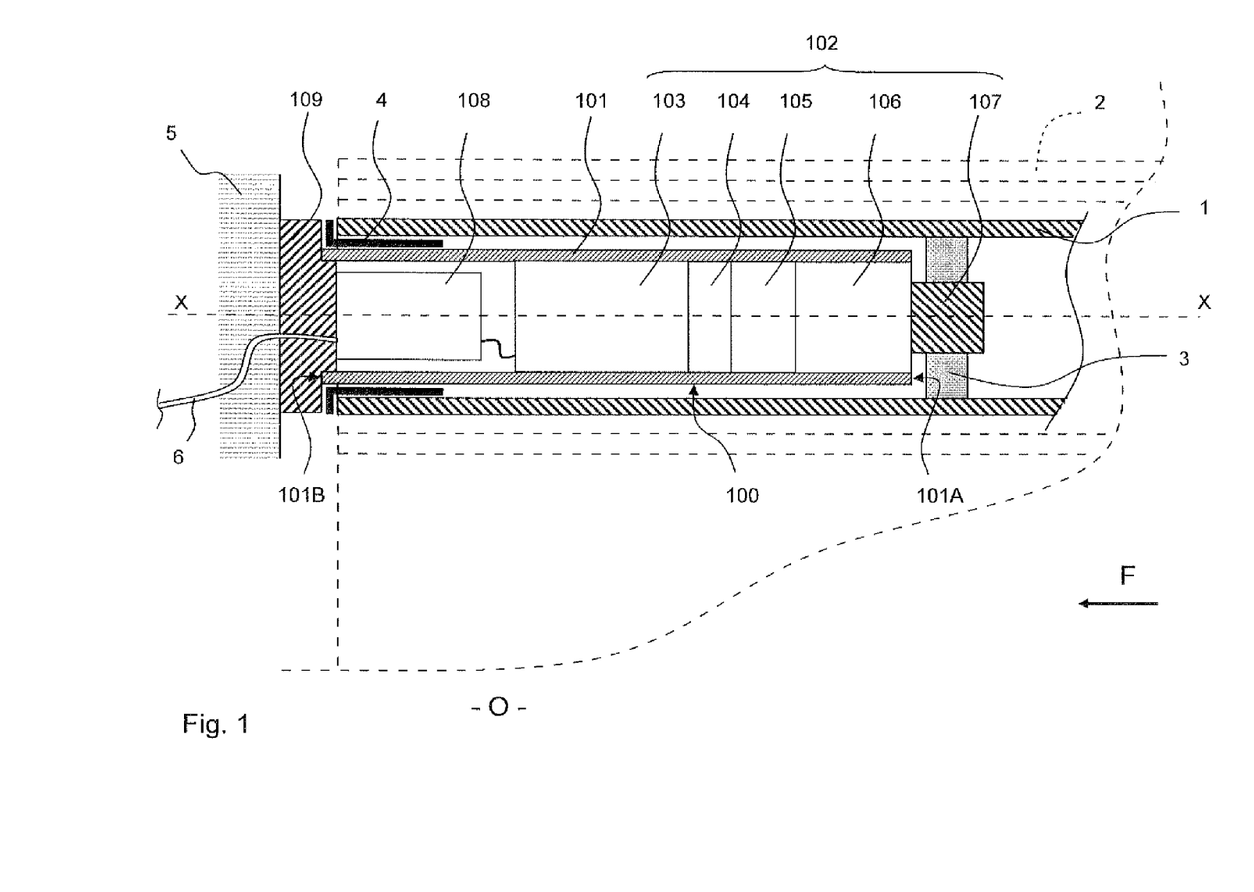
FIG. 1 is a schematic illustration of the design of a tubular actuator according to the invention incorporating a spring-loaded brake according to the invention.

FIG. 1 depicts a tubular actuator 100 intended to drive the rotation of a winding tube 1 onto which an apron 2 that closes off an opening O can be wound to a greater or lesser extent. The tube 1 is rotated by the actuator 100 about an axis of revolution X-X which runs horizontally at the upper part of the opening. The opening O is, for example, an opening made in the walls of a building. The actuator 100, the tube 1 and the apron 2 thus form a motorized roller shutter.

The actuator 100 comprises a fixed cylindrical tube 101 on which there is mounted a geared motor unit 102 comprising an electric motor 103, a first reduction stage 104, a spring-loaded brake 105, a second reduction stage 106 and an output shaft 107 which projects at one end 101A of the tube 101 and drives a ring gear 3 that rotates as one with the tube 1.

The winding tube 1 rotates about the axis X-X and about the fixed tube 101 by virtue of two pivot connections. A ring bearing 4, mounted on the exterior periphery of the tube 101 near its end 1013 opposite to the end 101A, provides the first pivot connection. The second pivot connection is installed at the other end of the tube 1 and has not been depicted.

The actuator 100 also comprises a fixing piece 109, projecting at the end 101B and allowing the actuator 100 to be fixed to a framework 5. This fixing piece 109 is also intended to close off the tube 101 and to support a control module 108 that controls the supply of power to the motor 103. This control module is powered by a main power lead 6.

When the tubular actuator 100 is in operation, the geared motor unit 102 drives the rotation of the shaft 107 which, in its turn, drives the rotation of the tube 1 via the ring gear 3. For example, when the actuator 100 is installed in a roller shutter casing, the rotation of the shaft 103 causes opening and, alternately, closing of the opening O.

FIGS. 2 to 8 more specifically illustrate the structure of the spring-loaded brake 105 according to a first embodiment of the invention. As depicted in FIG. 1, a rotor of the motor 103 drives the rotation of an epicyclic gear set of the first reduction stage 104. The output of this epicyclic gear set in turn drives the rotation of a piece 10 that forms the input of the brake 105. The piece 10 is provided with a polygonal shaft 19 intended to receive and to transmit torque from the reduction stage 104.

Figure 2:
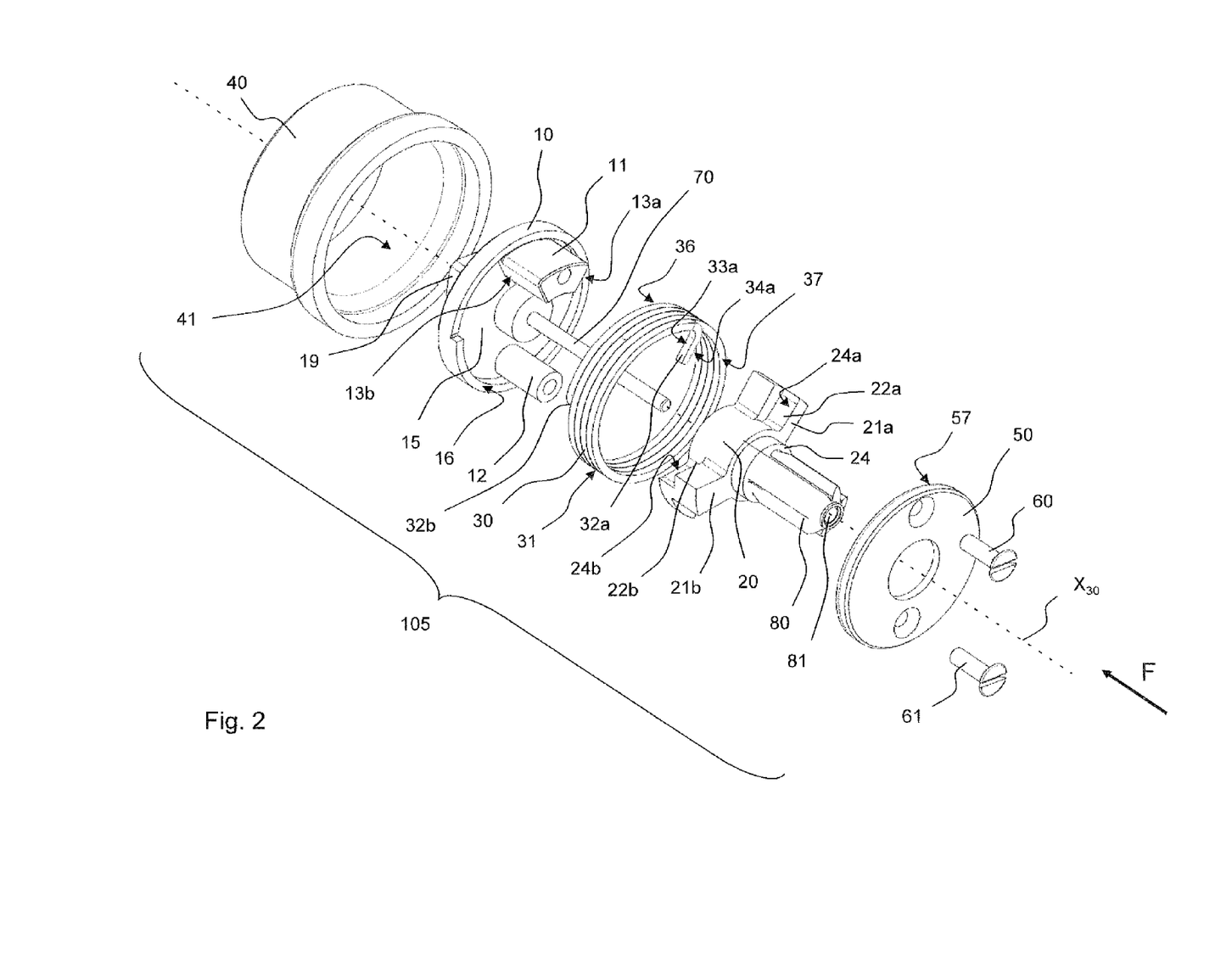
FIG. 2 is an exploded view of a spring-loaded brake that forms part of the actuator of FIG. 1.
Figure 3:
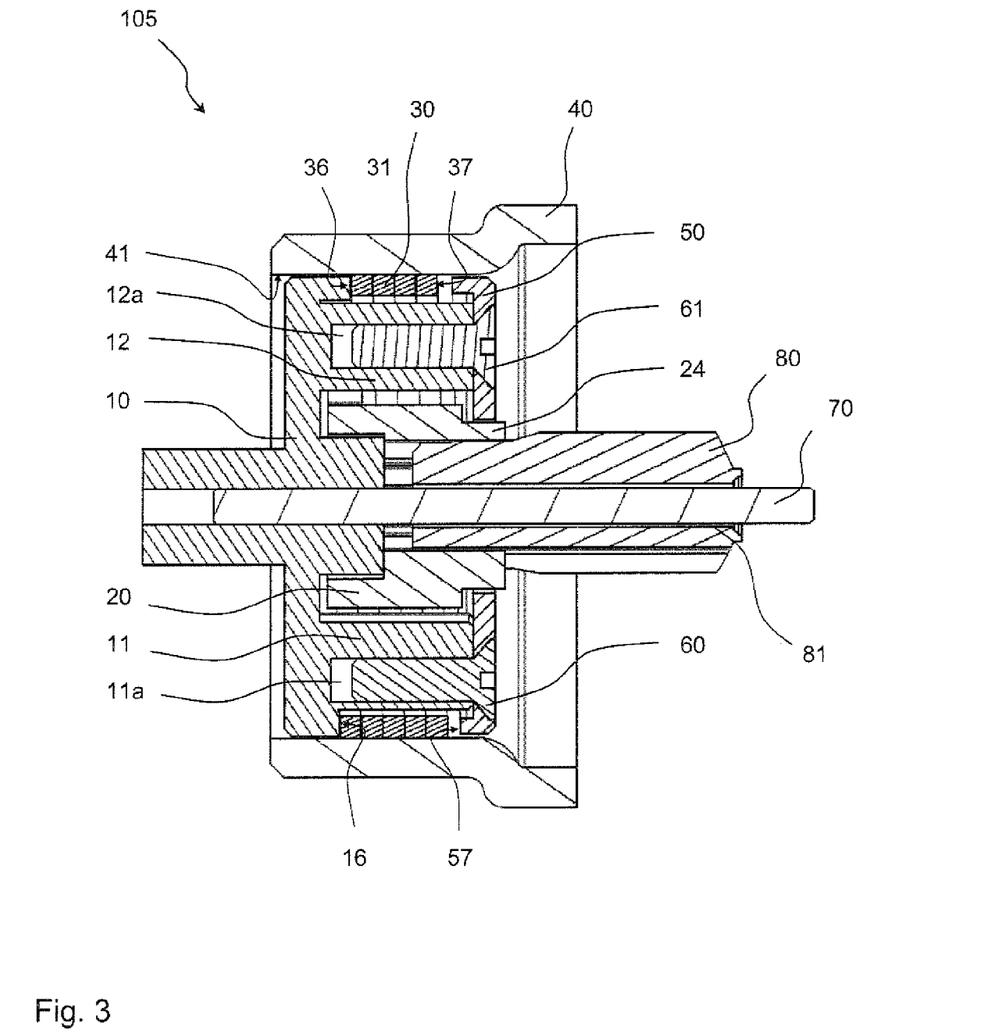
FIG. 3 is an axial cross section through the spring-loaded brake of FIG. 2.

The brake 105 comprises a helical spring 30 the turns of which are centred on an axis $X_{30}$ that coincides with the axis X-X when the brake 105 is in place as depicted in FIG. 1. This spring is mounted tightly inside a bore 41 of a friction piece 40. In other words, the external envelope 31 of the spring 30, which is defined by the external generatrices of its turns, presses against the radial surface of the bore 41, which tends, through friction, to cause the spring 30 and the piece 40 to behave as one.

Each end of the spring 30 forms a lug 32a, 32b extending radially towards the axis $X_{30}$ and towards the inside of the spring, from the turns thereof.

The input piece 10 comprises a tooth 11 that is inserted inside the helical spring 30, between the lugs 32a and 32b. This tooth 11 has two faces 13a, 13b able respectively to be in contact with a surface 33a of a first lug 32a that forms the first end of the spring and with a surface 33b of the second lug 32b that forms the second end of the spring. The surface 33a is arranged in such a way that action thereon causes the spring to rotate about the axis $X_{30}$ in an opposite direction to the direction in which the spring rotates if the action is exerted on the surface 33b.

Action by the tooth 11 on a surface 33a or 33b tends to release the brake, that is to say to turn the lug 32a or 32b in a direction such that the radial stress between the external envelope 31 of the spring 30 and the friction surface of the bore 41 reduces. Specifically, action of the tooth 11 on one of the faces 33a or 33b tends to cause the spring 30 to contract radially about the axis X-X so that its external envelope moves away from the surface of the bore 41. The piece 10 therefore allows the spring 30 to be acted on in such a way as to reduce the force of contact between the spring and the friction surface of the bore 41.

Facing the input piece 10 there is an output piece 20 of the brake 105. The latter comprises two ears 21a, 21b which likewise are inserted inside the helical spring 30. Each ear is respectively provided with a recess 22a, 22b intended to house one of the lugs 32a, 32b of the spring. Each recess is partially delimited by a surface 24a, 24b that can be in contact with a surface 34a, 34b of a lug 32a, 32b. The surfaces 34a and 34b lie respectively opposite the surfaces 33a and 33b.

Action on one of the surfaces 34a, 34b tends to move the lugs 32a and 32b closer together, and this has the effect of radially expanding the turns of the spring 30 with respect to the axis $X_{30}$ and of increasing the force of contact between the spring 30 and the friction surface of the bore 41. This amounts to actuating the brake, that is to say to locking or braking the rotation of the spring 30 with respect to the piece 40. Thus, the radial stress between the external envelope of the helical spring and the friction surface 41 increases.

For the brake to work, it is necessary to have some angular clearance between the tooth 11 of the input piece 10 and the lugs 32a and 32b of the spring. Likewise, it is also necessary to have some angular clearance between the ears 21a and 21b and the lugs 32a and 32b of the spring. The width of the tooth 11 is specified accordingly. In addition, the height of the parts 11, 21a and 21b is slightly greater than the length of the spring.

The output piece 20 carries a gear wheel 80 that forms the interface with the second reduction stage 106.

The required centring of the output piece 20 with respect to the input piece 10 is achieved by a shaft 70. This shaft is driven and blocked into a centred bore of the input piece 10. Part of the shaft 70 projects on the same side as the output piece 20 and serves to guide the gear wheel 80, thanks to a bore 81 drilled in its centre. This gear wheel is also driven in its centre onto the output piece 20, providing the desired centring.

Figure 6:
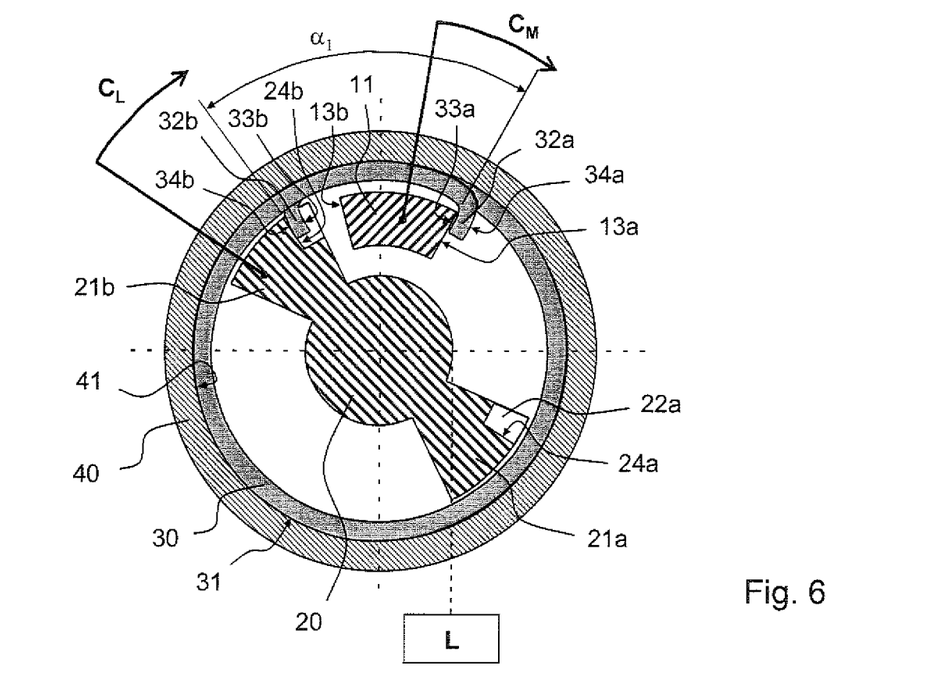
FIGS. 6 to 8 are schematic illustrations, with the spring-loaded brake in cross section, of the stages of operation of the brake when lowering a load.
Figure 7:
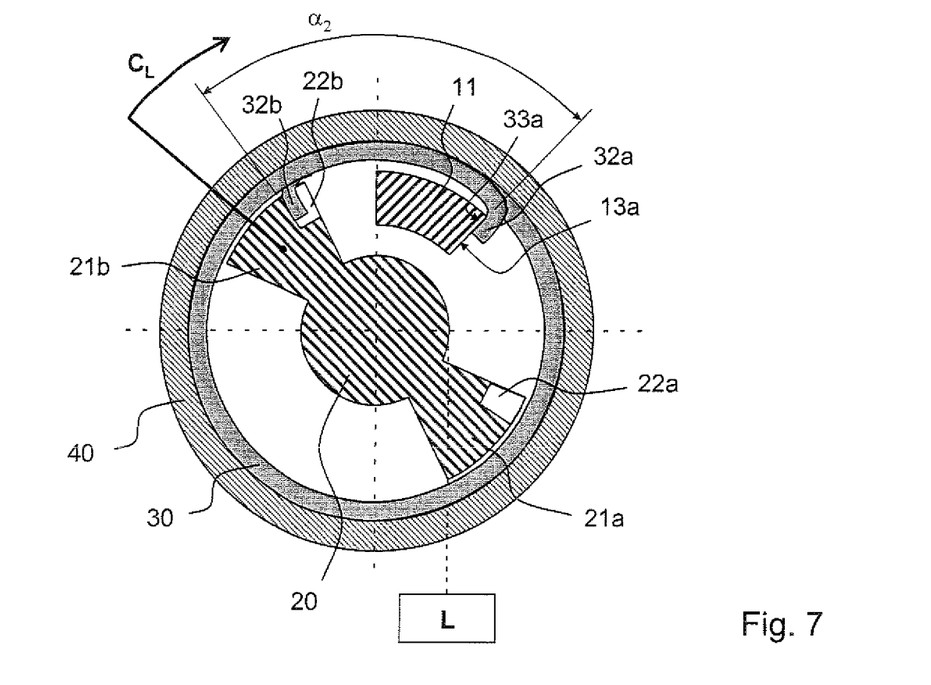
Figure 8:
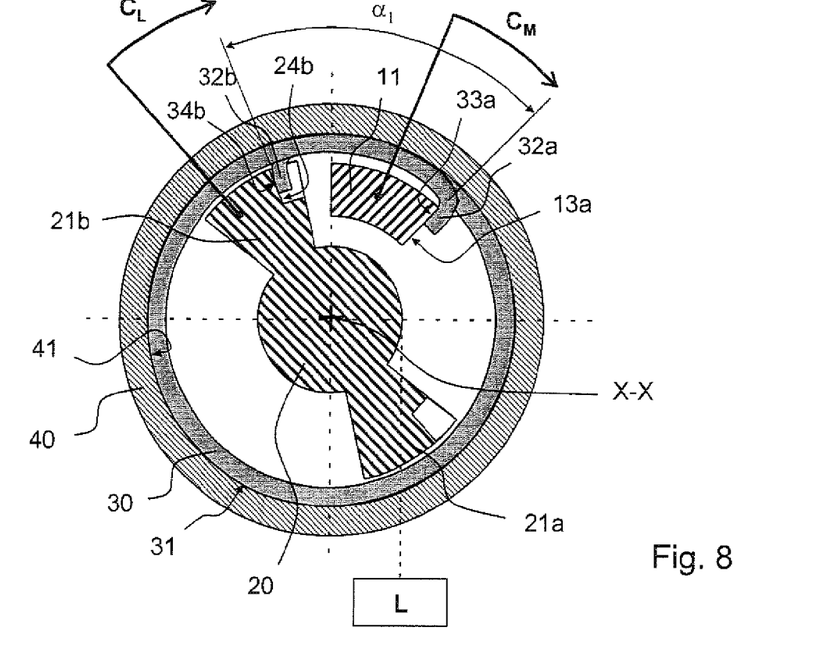

As is more particularly apparent from FIGS. 6 to 8, the load L consisting of the apron 2 may be considered as being integral with the piece 20, through the elements 1, 3, 106 and 107, and that is what the vertical dotted line in FIGS. 6 to 9 represents.

By default, the weight of the load L exerts on the piece 20 a torque $C_L$ which presses one of the ears 21a or 21b, in this instance the ear 21b, against one of the lugs 32a or 32b, in this instance the lug 32b. This has the effect of radially expanding the turns of the spring 30 and of activating the brake 105, as explained hereinabove. The torque $C_L$ applied by the ear 21b to the surface 34b of the lug 32b is weighted by the effectiveness of the second reduction stage 10b. The lug 32b is therefore engaged in the housing 24b.

As the load L is raised, the input piece 10 is rotated by a torque generated by the motor and weighted by the efficiency of the first reduction stage 104. The tooth 11 of the input piece therefore turns until it comes into contact with the ear 21b of the output piece. To raise the load, the torque $C_M$ therefore has to be greater than the sum of the torque $C_L$ and of a drag torque of the brake spring that is due to the residual friction between the external envelope of the spring and the friction surface of the bore 41. On start-up, the torque that has to be exerted needs to be greater because, in order to release the brake 105, it is necessary to overcome a static friction force. To release the brake 105, the tooth 11 acts on the lug, in this instance the lug 32b, of the spring housed in the recess 24b as soon as the ear is being turned.

FIG. 6 depicts the start of a lowering of the load L. The two lugs of the spring 32a and 32b are separated by an angle $\alpha_1$. The surface 24b of the ear 21b is acting on the surface 34b of the lug 32b of the spring under the effect of the torque $C_L$ due to the weight of the load L. This action tends to press one or more turns of the spring 30 against the surface of the bore 41. The brake 105 is activated.

When the motor 103 is activated to lower the load L, it exerts on the tooth 11 a torque $C_M$ directed in the same direction as the torque $C_L$ but applied to the surface 33a of the lug 32a. The tooth 11 takes up an angular clearance in order to come to rest against the lug 32a. The face 13a of the tooth comes into contact with the surface 33a of the second lug 32a of the spring. Application of the driving torque $C_M$ to the input piece therefore causes the lugs of the spring to part. This parting has a tendency to reduce the diameter of the external envelope 31 of the spring 30 and therefore to reduce the force of contact and the friction forces between the spring 30 and the friction surface. For a certain angle $\alpha_2$ between the lugs 32a and 32b, this friction torque becomes lower than the torque $C_L$. This then is a return to the configuration illustrated in FIG. 7 in which the brake 105 is released. The output piece 20 rotates under the action of the torque $C_L$, thus reducing the separation of the lugs of the spring to return to an angle of a value of $\alpha_1$ or close to this value. The friction forces between the spring and the friction surface therefore increase. The brake 105 is once more activated. This then is a return to the configuration depicted in FIG. 8, which is analogous to the configuration of FIG. 6 except that the piece 20 is turned. These dynamics are repeated as long as the torque $C_M$ is applied.

Figure 4:
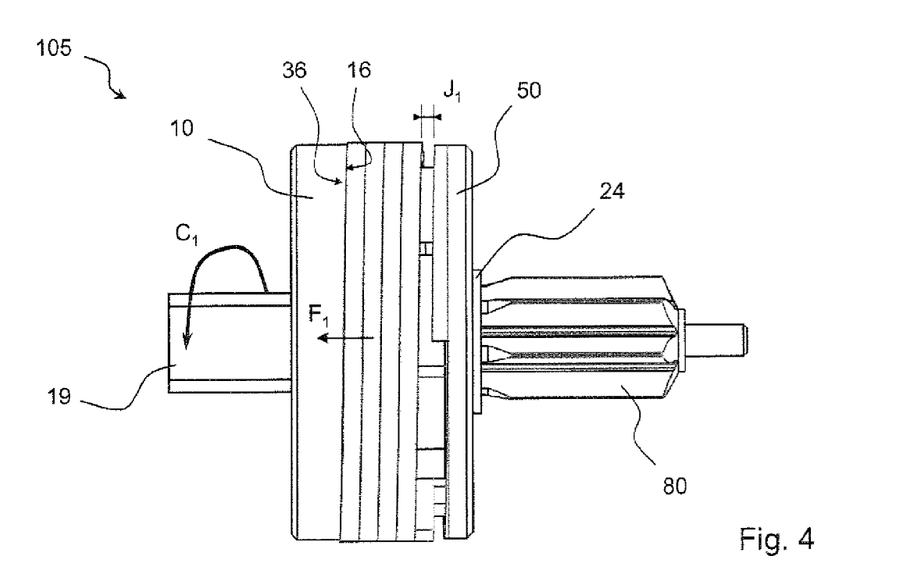
FIG. 4 is a side view of the spring-loaded brake of FIGS. 2 and 3 when the spring is pressed axially to one side.
Figure 5:
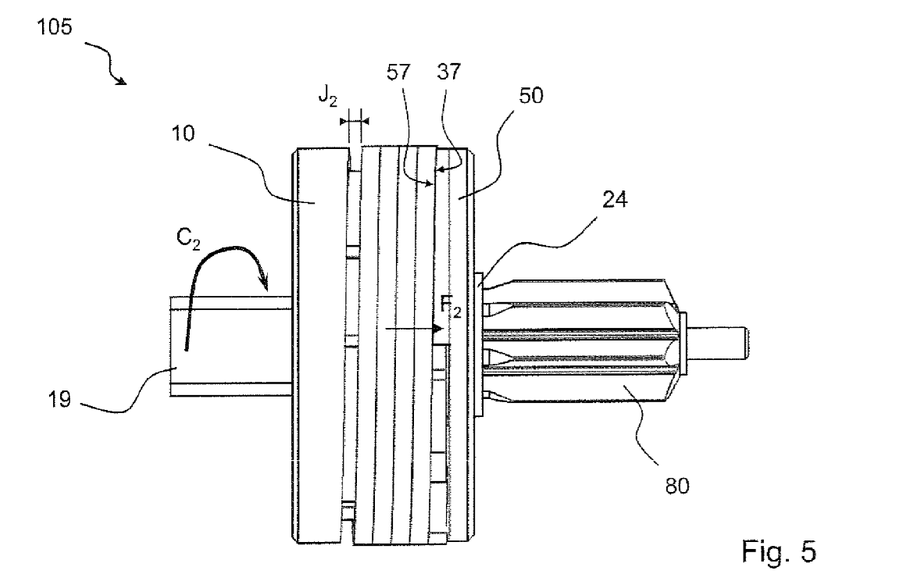
FIG. 5 is a side view of the spring-loaded brake of FIGS. 2 and 3 when the spring is pressed axially to the other side.

When the spring 30 is turned by the tooth 11 of the input piece, via one of its end lugs, the spring behaves like a screw inside a nut embodied by the friction piece 40. The spring moves axially, along the axis X-X, in a direction that is dependent on the direction of the helix of the spring. The spring may therefore move in two opposite directions according to which end of the spring is loaded by the input piece 10, as illustrated in FIGS. 4 and 5. In the example depicted, in a frame of reference associated with the face-on view F, the load L is wound around the winding tube in a trigonometric or anticlockwise direction. The raising of the load L therefore corresponds to a movement of the tooth 11 in the trigonometric direction in FIG. 6, and this has a tendency to cause the spring 30 to turn in the same direction, moving it closer to the input piece, to attain the configuration of FIG. 4.

Conversely, the lowering of the load L results in an axial movement of the spring 30 away from the piece 10, to attain the configuration of FIG. 5.

In conventional spring-loaded brake structures, the spring is stopped axially on one side by the input piece and on the other side by a stop piece not directly connected to the input piece. The stop piece and the input piece may therefore rotate at different speeds, at least during certain phases of operation. When the brake is released, the spring rotates as one with the input piece because it is the tooth of this piece that turns the spring. As a result, if the spring is then pressed axially against a stop piece that does not rotate as one with the input piece, that generates parasitic friction causing vibrations and noise. This effect is not continuous and occurs when there is a variation in speed between the stop piece and the part of the turn of the spring that is in contact with the stop piece. This phenomenon does not arise when a load is being raised, but does so when a load is being lowered.

To solve this problem, the input piece 10 and the piece forming the end stop for axial movement of the spring in a direction away from the piece 10 are made to rotate as one.

The input piece 10 comprises a disc 15 from which there project, on the same side, the tooth 11 and a screwing shank 12. Two tappings 11a and 12a are formed respectively in the elements 11 and 12, parallel to the axis X-X when the actuator 100 is in its assembled configuration.

The input piece 10 forms a first axial end stop against the axial movement of the spring.

The piece that forms the second axial end stop is a washer 50 fixed to the piece 10 by two screws 60 and 61 tightened respectively into the tappings 11a and 12a. The washer 50 is engaged around a circular collet 24 of the piece 20, and can rotate about this circular collet.

FIG. 4 shows that, if a torque 2, is applied to the input piece 10 in a direction of raising the load L, the spring 30, driven by the tooth 11, moves axially towards the input piece 10 which forms a first end stop against this axial movement. The direction of axial movement of the spring 30 in this case is represented by the arrow $F_1$ in FIG. 4. The axial face 36 of the first turn of the spring therefore becomes firmly pressed against the axial face 16 of the input piece 10. In a particularly advantageous manner, the axial face 16 of the input piece is inclined so as to form part of a helix the angle of which is substantially identical to that of the helix of the spring. The other end of the spring is distant, by an axial clearance $J_1$, with respect to the washer 50.

Conversely, if a torque $C_2$ is applied to the input piece 10 in a direction of lowering the load L, the spring 30 moves axially towards the washer 50 in the direction of the arrow $F_2$ in FIG. 5. The axial face 37 of the last turn of the spring is then pressed firmly against the axial face 57 of the washer 50. Here again, this axial face may be inclined to give the spring a better seating. The first turn of the spring is distant, by an axial clearance $J_2$, with respect to the input piece 10.

The axial faces 16 and 57 of the pieces 10 and 50 therefore constitute end stops to the axial movement of the spring 30 parallel to axis X-X. The end stop 16 limits this movement when the movement is in the direction of the arrow $F_1$, whereas the end stop 57 limits this movement when it is in the direction of the arrow $F_2$.

There are other conceivable embodiments for causing the piece that forms the second end stop and the input piece to rotate as one. Thus, when the input piece is driven, the piece that forms the second axial end stop for the spring rotates at the same speed as the spring, whatever the direction of rotation. The parasitic effect due to friction between the spring and the axial end stop, as was known in the prior art, is eliminated.

Figure 9:
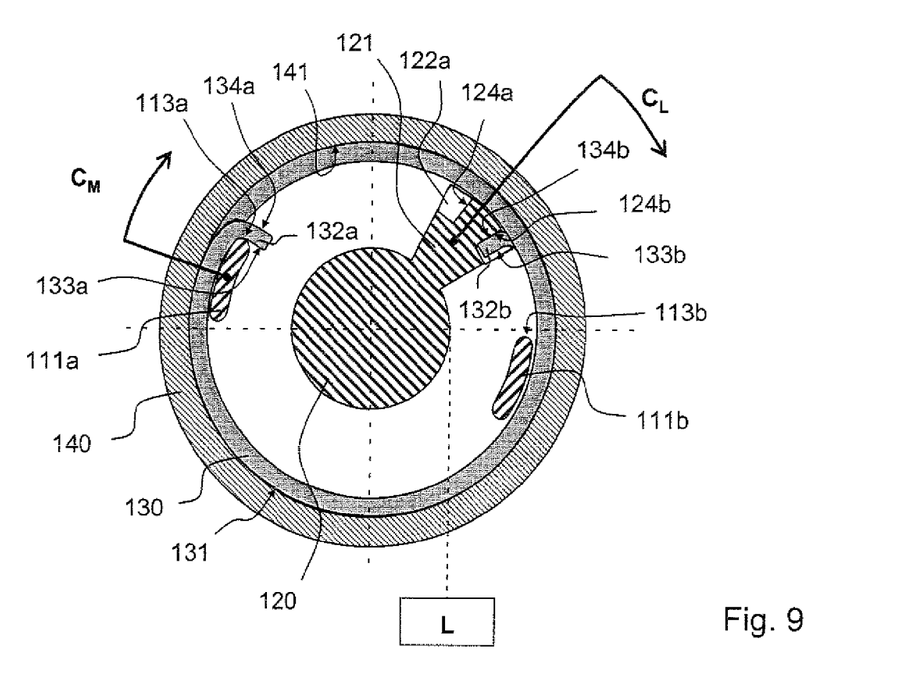
FIG. 9 is a schematic illustration similar to FIG. 7, for a second embodiment of the spring-loaded brake.

FIG. 9 depicts a second embodiment of the spring-loaded brake. It contains the various brake elements described previously. The references of these components bear references similar to the first embodiment, increased by 100. The differences are that the lugs 132a and 132b are arranged differently. As a result, the tooth 11 is replaced by two teeth 111a and 111b and the two ears 21a and 21b are replaced by a single ear 121. The way in which the brake works is the same. Alternatively, the two teeth 111a and 111b may be connected to form an arc-shaped rib. This embodiment comprises pieces forming axial end stops which are not depicted and which respectively consist of the input piece and of another piece that rotates as one with this input piece, as in the first embodiment.

According to an undepicted alternative form of the invention, the pieces 10 and 20 may constitute elements of the reduction stages 104 and 105, improving the axial compactness of the actuator 100.

Another alternative form would be to reverse the operation of the brake, that is to say for the helical spring to be mounted as a tight fit on a friction shaft rather than being mounted as a tight fit inside a bore. The lugs would then extend radially outwards. This embodiment has not been illustrated, but its principle of operation is described in patent EP-B-0 976 909. This configuration proves to be less compact than the previous embodiments.

The brake 105 does not especially have to be housed between two reduction stages of the actuator. The brake 105 may thus be positioned between the motor and the reduction gear, in the reduction gear between two reduction stages, or on the output side of the reduction gear.

The invention is of great benefit to tubular motors but can also be applied to other types of motors or manual control systems.

The invention claimed is:

1. A spring loaded brake for an actuator for driving a household screen, comprising:
    a helical spring having opposite ends formed as lugs which extend radially inward relative to a central axis of the spring,
        a friction piece including a substantially cylindrical friction surface against which at least one turn of the spring presses radially,
        an input piece for contacting at least one lug of the spring so as to drive the spring in rotation about the central axis of the spring in a direction that reduces a force of contact between the spring and the friction surface,
        an output piece for contacting at least one lug of the spring so as to drive the spring in rotation about the central axis in a direction increasing the force of contact between the spring and the friction surface, and
        spaced end stops positioned on opposite ends of the spring and being joined to one another so as to always rotate as one about the central axis of the spring and each of which includes a portion which is engaged to stop an axial movement of the spring, wherein one end stop limits the axial movement of the spring in a first direction and the other end stop limits the axial movement of the spring in a second direction opposite to the first direction.

2. The spring loaded brake according to claim 1, including cooperating fastener elements on each of the end stops for permitting a variable orientation of assembly between the end stops.

3. The spring loaded brake according to claim 1, wherein one of the end stops is formed by a portion of the input piece.

4. The spring loaded brake according to claim 1, wherein one of the end stops is a washer engaged to rotate around a member integral with the output piece.

5. The spring loaded brake according to claim 1, wherein the friction surface is formed by a bore of the friction piece.

6. The spring loaded brake according to claim 1, wherein the input piece and the output piece are centered relative to one another by a shaft that passes through the two pieces.

7. The spring loaded brake according to claim 1, wherein the input piece and the output piece functions as one element of a reduction stage of the actuator.

8. The spring loaded brake according to claim 1, wherein at least one end stop for the spring is in a form of an inclined surface forming a portion of a helix having an angle substantially equal to that of a helix of the spring.

9. A rotary actuator for driving a household screen comprising a spring loaded brake including;
    a helical spring having opposite ends formed as lugs which extend radially inward relative to a central axis of the spring, a friction piece in which the spring is positioned including a substantially cylindrical friction surface against which at least one turn of the spring presses radially outwardly, an input piece for contacting at least one lug of the spring so as to drive the spring in rotation about the central axis of the spring in a direction that reduces a force of contact between the spring and the friction surface, an output piece for contacting at least one lug of the spring so as to drive the spring in rotation about the central axis in a direction increasing the force of contact between the spring and the friction surface, and spaced end stops positioned on opposite ends of the spring and being joined to one another so as to always rotate as one about the central axis of the spring and each of which includes a portion which is engaged to stop an axial movement of the spring, wherein one end stop limits the axial movement of the spring in a first direction and the other end stop limits the axial movement of the spring in a second direction opposite to the first direction.

* * * * *